United States Patent [19]

Malm

[11] Patent Number: 5,741,573

[45] Date of Patent: Apr. 21, 1998

[54] RECYCLABLE PINCH FLANGE WELT AND METHOD OF MAKING SAME

[75] Inventor: Douglas N. Malm, Northville, Mich.

[73] Assignee: The Standard Products Company, Cleveland, Ohio

[21] Appl. No.: 611,726

[22] Filed: Mar. 6, 1996

[51] Int. Cl.[6] .................... B32B 3/02; E06B 7/16
[52] U.S. Cl. .................... 428/83; 49/483.1; 49/490.1; 49/496.1; 49/DIG. 2; 428/31; 428/122; 428/188; 428/318.6; 428/358
[58] Field of Search .................. 49/475.1, 483.1, 49/490.1, 496.1, DIG. 2; 428/76, 83, 31, 122, 318.6, 358, 188

[56] References Cited

U.S. PATENT DOCUMENTS

| | | |
|---|---|---|
| 3,706,173 | 12/1972 | Taylor . |
| 3,801,404 | 4/1974 | Druin et al. . |
| 3,900,550 | 8/1975 | Oliver et al. . |
| 4,182,582 | 1/1980 | Youval et al. . |
| 4,322,260 | 3/1982 | Conlon . |
| 4,526,735 | 7/1985 | Norota et al. . |
| 4,541,981 | 9/1985 | Lowery et al. . |
| 4,552,708 | 11/1985 | Kimura et al. . |
| 4,656,086 | 4/1987 | Bowers et al. . |
| 4,676,856 | 6/1987 | Shigeki et al. . |
| 4,731,212 | 3/1988 | Hasegawa . |
| 4,830,898 | 5/1989 | Smith . |
| 4,844,762 | 7/1989 | Schroder . |
| 4,885,317 | 12/1989 | Thein et al. . |
| 4,897,030 | 1/1990 | Vajtay . |
| 4,970,102 | 11/1990 | Guillon ................... 428/122 |
| 5,029,931 | 7/1991 | Asaba et al. . |
| 5,043,128 | 8/1991 | Umeda . |
| 5,143,772 | 9/1992 | Iwasa . |
| 5,347,759 | 9/1994 | Kobayashi et al. . |
| 5,403,632 | 4/1995 | Mesnel et al. ................ 428/31 |
| 5,411,785 | 5/1995 | Cook ...................... 428/122 |

FOREIGN PATENT DOCUMENTS

| | | |
|---|---|---|
| 0 408 291 A1 | 1/1991 | European Pat. Off. . |
| 0 553 018 A1 | 7/1993 | European Pat. Off. . |
| 0 730 990 A1 | 9/1996 | European Pat. Off. . |
| 81 21975 | 5/1983 | France . |
| 3835211 A1 | 4/1990 | Germany . |
| 2 279 985 | 1/1995 | United Kingdom . |

*Primary Examiner*—Marion E. McCamish
*Assistant Examiner*—Blane R. Copenheaver
*Attorney, Agent, or Firm*—Harness, Dickey & Pierce, P.L.C.

[57] ABSTRACT

A pinch welt for trimming a flange formed on a vehicle body panel is disclosed. The welt includes a rigid insert made of a thermoplastic or synthetic rubber material that is compatible with the material of an outer decorative layer of the welt so as to allow the pinch welt to be readily recyclable as a single unit after use. The material of the insert has a resilience that allows the welt to be readily secured to the flange in a resilient manner. The insert is shaped by cooperating continuous forming rolls in an extrusion process that provides oppositely extending tines in which a thin webbing is formed between the tines.

20 Claims, 2 Drawing Sheets

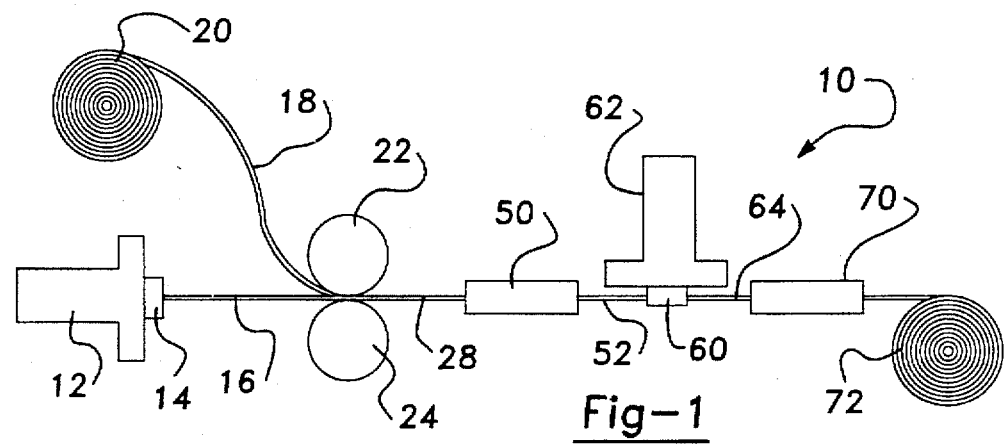
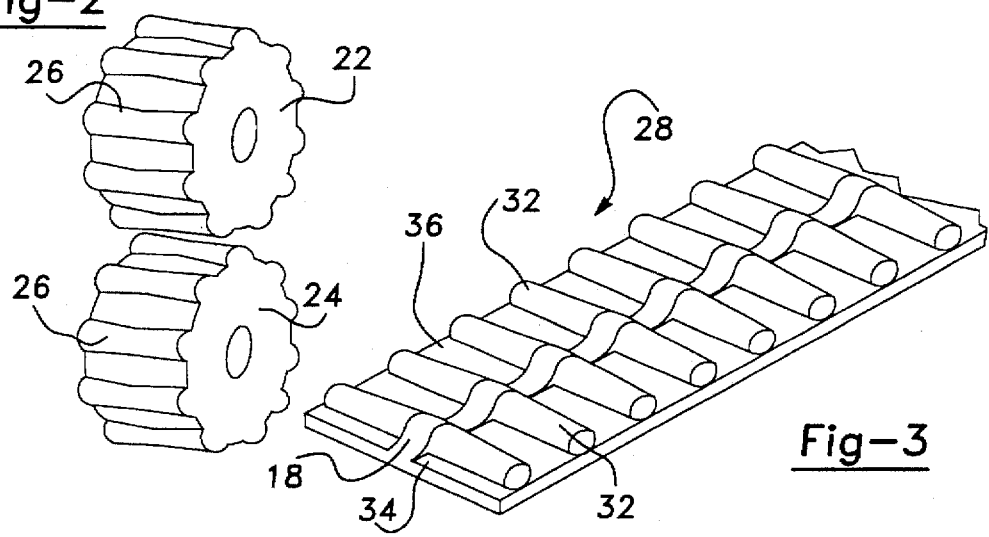
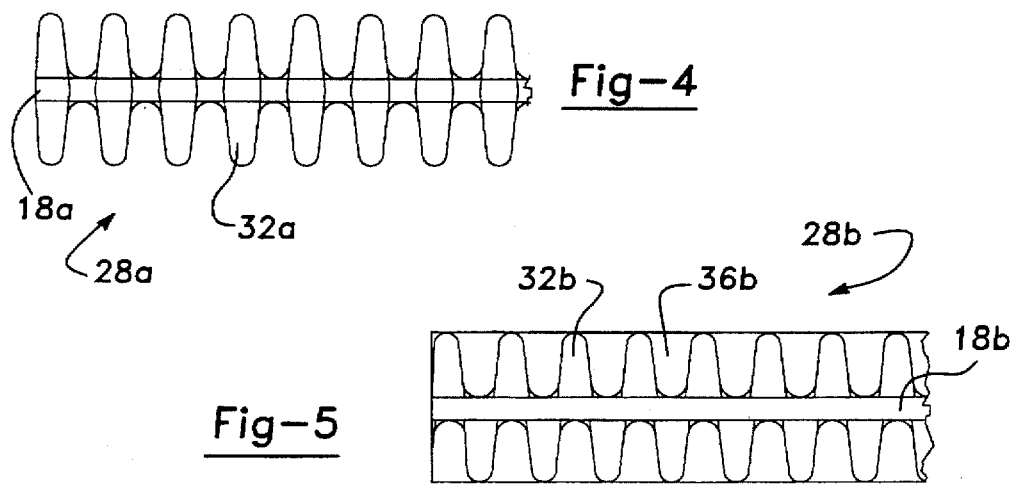

5,741,573

RECYCLABLE PINCH FLANGE WELT AND METHOD OF MAKING SAME

BACKGROUND OF THE INVENTION

1. Field of the Invention

This invention relates generally to a vehicle molding and, more particularly, to a pinch welt attached to a flange in which the pinch welt includes a resilient insert made of a material compatible with an outer decorative layer of the pinch welt so as to allow the pinch welt to be recyclable as a single unit.

2. Discussion of the Related Art

Most vehicle bodies are an assembly of separate steel panels that are cut and stamped into a particular shape. The panels are generally secured together by welding and/or crimping the panels where appropriate. Examples of such panels include inner and outer door panels, roof panels, hood panels, and trunk panels. These vehicle body panels may include various flanges and metal edges as defined by the particular shape of the panel. These flanges and metal edges may be in a location where they are unsightly, and may cause injury from contact or damage clothing. For at least these reasons, various moldings are sometimes secured to the flange or metal edge to provide a more aesthetically pleasing appearance, and provide protection against contact with the flange. One example of a molding of this type can be found in U.S. Pat. No. 4,656,086 issued to Bowers et al.

These moldings are generally extruded members formed by coextruding an outer decorative layer of a suitable extrudable material, such as a thermoplastic, synthetic rubber, or other extrudable material, onto a metal insert, made of, for example, steel or aluminum, that gives the molding rigidity and shape. The molding is formed into a U-shape to define a channel that allows the molding to be inserted onto the flange or metal edge. Another example of this type of molding having a metal insert can be found in U.S. Pat. No. 4,830,898 issued to Smith. Sometimes, a seal gasket, or other structural piece, is extruded along with the molding, or is later attached to the molding.

Although the current moldings used for this purpose have been successful in meeting the general demands of the industry, a number of areas can be improved upon. For example, Because the moldings generally include an outer decorative layer of a thermoplastic or rubber material coextruded onto a metal insert, the molding includes two separate materials that are incompatible for recycling purposes. Therefore, after the useful life of the molding, or the useful life of the vehicle on which the molding is secured, the molding cannot be recycled as a single unit. In order to recycle the molding, it is necessary to separate the outer thermoplastic layer from the metal insert. Such a process is not cost effective, and is inherently unfeasible.

Another area of improvement exists in that although the metal insert provides the necessary rigidity, it does not provide the resilience desirable that would cause the molding to be secured to the flange or edge in a grasping manner. The rigidity of the metal insert causes the molding to have to be forced onto the curves of the flange in a stretch bending operation. Once the molding is forced onto the flange, the metal insert does not allow the legs of the U-shaped channel to flex back and grasp the flange. Therefore, the molding is not secured to the flange as well as it could be.

What is needed is a pinch welt that incorporates entirely compatible components for recycling purposes, and provide a resiliency that allows the molding to grasp the flange. It is therefore an object of the present invention to provide such a pinch welt.

SUMMARY OF THE INVENTION

In accordance with the teaching of the present invention, a pinch welt for a pinch flange or metal edge of a vehicle panel is disclosed that includes a rigid insert made of a thermoplastic or synthetic rubber material that is compatible with the material of an outer decorative layer of the welt so as to allow the pinch welt to be readily recyclable as a single unit after use. The material of the insert has a resilience that allows the welt to be readily secured to the pinch flange in a resilient manner. In one embodiment, the insert is shaped by cooperating continuous forming rolls in an extrusion process so as to have oppositely extending tines in which a thin webbing is formed between the tines.

Additional objects, advantages and features of the present invention will become apparent from the following description and appended claims, taken in conjunction with the accompanying drawings.

BRIEF DESCRIPTION OF THE DRAWINGS

FIG. 1 is a general plan view of a system for developing a recyclable pinch welt according to an embodiment of the present invention;

FIG. 2 is a perspective view of a pair of continuous forming rolls of the system of FIG. 1;

FIG. 3 is a perspective view of a continuous melt strip formed by the forming rolls of FIG. 2 according to one embodiment;

FIG. 4 is a top view of a continuous melt strip formed by the forming rolls of FIG. 2 according to another embodiment;

FIG. 5 is a top view of a continuous melt strip formed by the forming rolls of FIG. 2 according to yet another embodiment of the present invention;

DETAILED DESCRIPTION OF THE PREFERRED EMBODIMENTS

Figure 6:
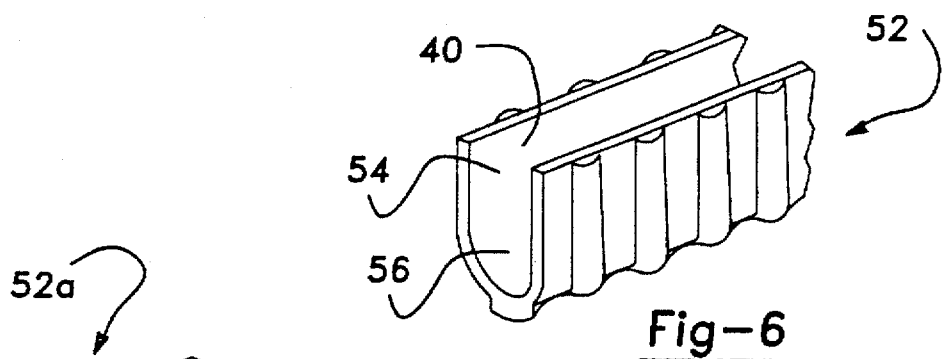
FIG. 6 is a perspective view of the melt strip shown in FIG. 3 formed into a U-shape insert including tines that are positioned on the outside of the insert according to one embodiment of the invention.

The following description of the preferred embodiments directed to a recyclable pinch welt is merely exemplary in nature and is in no way intended to limit the invention or its applications or uses.

First turning to FIG. 1, a general plan view of a system 10 for producing a recyclable pinch welt according to an embodiment of the present invention is shown. Each of the separate components of the system 10 is shown by way of a general depiction. However, these components are well known in the industry, and their specific illustrations and operation would be readily apparent to those skilled in the art. The system 10 includes an extruder 12, having a die head 14 that produces a continuous hot melt strip 16, in a sheet-like format. The extruder 12 can be any source that is capable of generating a hot melt strip of a thermoplastic, PVC, thermoset or rubber material suitable for the purposes described herein. Further, a narrow strip 18 of a reinforcement material, such as a higher density thermoplastic or nylon cord, is unrolled from a roller 20. The reinforcement strip 18 and the melt strip 16 are introduced into a pair of cooperating continuous forming rolls 22 and 24. The reinforcement strip 18 gives the melt strip 16 reinforcement to allow it to be pulled through the system 10.

FIG. 2 shows a perspective view of the cooperating rolls 22 and 24 separated from the system 10. Each of the cooperating rolls 22 and 24 includes a series of spaced apart ridges 26 that cooperate with each other to produce a flat melt strip 28 having a series of ridges, as will be described in further detail below.

FIG. 3 is a perspective view showing one embodiment of the melt strip 28 as formed by the cooperating forming rolls 22 and 24. As is apparent, the ridges 26 form a pattern of tines 32 that extend opposite to each other away from a common central base portion 34. In this embodiment, the position of the ridges 26 and the cooperating forming rolls 22 and 24 are such that a continuous thin film web 36 is formed between the tines 32. The thin film web 36 gives the formed melt strip 28 more flexibility and provides ease of manufacture. The reinforcement strip 18 runs down the center of the base portion 34, as shown. The ridges 26 have a shape such that a middle portion of the ridges 26 is narrower than end portions of the ridges 26. This shape forms the inside area between adjacent tines 32 at the base portion 34 to be wider than the ends of the tines 32. This configuration allows the tines 32 to be more rigid and flexible at the area of the base portion 34. Alternately, the ridges 26 can be of a consistent width across their entire length, but can be thinner towards a middle portion of the ridge 26 so that the tines 32 are thicker proximate the base portion 34.

The melt strip 28 as shown in FIG. 3 is formed by the forming rolls 22 and 24 such that the web 36 is developed between the tines 32. In an alternate embodiment, the position of the ridges 26 and the cooperating forming rolls 22 and 24 can be configured such that the web 36 is eliminated, and no material is formed between the tines 32. This embodiment is shown in FIG. 4 where a formed melt strip 28a includes tines 32a in the same manner as described above in which no material is left between the tines 32a. The resulting pinch welt may turn better on a radius without the web 36.

The tines 32 and 32a are shown extending in an opposite manner from one another in the above-described embodiments. Alternately, the ridges 26 and the forming rolls 22 and 24 can be configured such that the tines alternate from one side to the other. This embodiment is shown in FIG. 5 in which a thermoplastic melt strip 28b includes tines 32b that extend from the base portion 34b of the formed melt stream 28b in an alternating fashion. This embodiment shows the webbing 36b, however, it will be appreciated by those skilled in the art that this webbing can be removed as with the embodiment 28a, discussed above.

The examples of the shapes of the tines 32, 32a and 32b formed by the ridges 26 of the cooperating rolls 22 and 24 are by way of non-limiting examples. As will be appreciated by those skilled in the art, the shape of these tines can be many other shapes and still provide the rigidity and resilience desirable for the specific purposes described herein.

Figure 7:
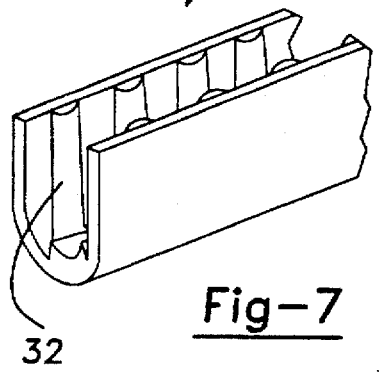
FIG. 7 is a perspective view of the melt strip shown in FIG. 3 formed into a U-shaped insert including tines that are positioned on the inside of the insert according to another embodiment of the invention.

As discussed above, the formed melt strip 28 is generally a flat sheet as it is pulled through the forming rolls 22 and 24. In order to form the melt strip 28 into a channel suitable to be attached to a flange or metal edge, the melt strip 28 is introduced into a forming die or block 50. The forming block 50 bends and shapes the formed melt strip 28 into a U-shaped insert 52 having upwardly extending legs 54 extending from the base portion 34 so as to define a channel 56. FIG. 6 shows a perspective view of the insert 52 according to one embodiment. In this embodiment, the forming block 50 forms the melt strip 28 such that the tines 32 are positioned on an outside of the channel 56. Alternately, the forming block 50 can form the melt stream 28 into a U-shaped insert 52a, as shown in perspective in FIG. 7, where the tines 32 are on an inside of the channel 56. When the tines 32 are on the outside of the U-shaped insert 52, the inside surface of the webbing 36 provides a smooth surface within the channel 56 which aids in the installation onto the pinch flange. However, with the tines 32 on the outside of the U-shaped insert 52, material sinks may be formed possibly giving a "hungry horse" appearance known to those skilled in the art. Therefore, it may be more desirable to have the tines 32 on the inside of the insert 52.

In these embodiments, the reinforcement strip 18 is shown on a top surface of the base portion 34. However, it is certainly within the scope of the present invention that the forming block 50 can form the insert 52 such that the reinforcement strip 18 is outside the channel 56 on the base portion 34. Further, the position of the roller 20 can be at a bottom location relative to the extruder 12 such that the reinforcement strip 18 is introduced into the cooperating rollers 22 and 24 beneath the melt strip 16.

Figure 8:
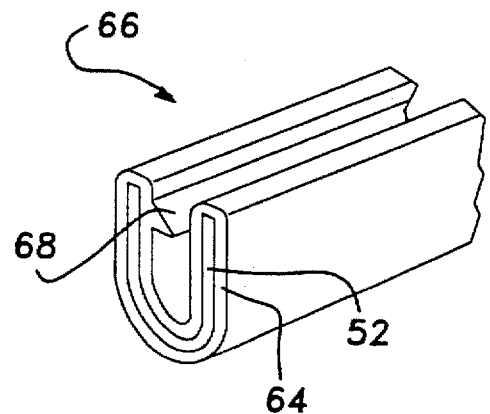
FIG. 8 is a perspective view of a pinch welt formed by the system of FIG. 1 according to an embodiment of the present invention.

The U-shaped insert 52 is introduced into a die 60 of a cross-head extruder 62 in order to form an outer decorative layer around the insert 52. The cross-head extruder 62 extrudes an outer thermoplastic layer 64 around the U-shaped insert 52 to form a pinch welt 66 in a manner that is well understood in the art. A perspective view of the pinch welt 66 at this stage of the processing is shown in FIG. 8. The outer layer 64 can be any applicable extrudable thermoplastic thermoset or synthetic rubber material that provides the appearance and rigidity suitable for the desired purpose. In one embodiment, the outer layer 64 is an open cell foam that gives the pinch welt 66 an appearance of a high grade cloth material. In this embodiment, the insert 52 has a higher Young's Modulus than the Young's Modulus of the outer layer 64 so that bending of the legs 54 of the insert 52 causes the legs 54 to be resiliently returned to their original position. The known vehicle moldings having metal inserts did not provide this resiliency where the legs of the molding would return to an original position. Because the U-shaped insert 52 has a higher Young's modulus than the outer layer 66, it provides an elasticity not found in the prior art pinch welts that include metal inserts. The die 60 forms a lip member 68 internal to the channel 56 in order to better grasp the pinch flange.

The pinch welt 66 is then introduced into a cooling bath 70 that cools the pinch welt 66 so that it can be wound on a take-up wheel 72. The cooling bath 70 can be various water type baths or mist baths, and may have vacuum sizing if hollow bulbs or sections are required on the welt 66. The take-up wheel 72 pulls the forming pinch welt 66 through the system 10 from the extruder 12 under the reinforcement of the reinforcement strip 18.

The pinch welt 66 includes an outer layer of a suitable thermoplastic or synthetic rubber specially designed for the appearance and function for the particular use. For example, different areas of the vehicle and different types of vehicles may require moldings having higher grade appearances, or better durability. The insert 52 consists of a compatible thermoplastic or synthetic rubber material that provides the necessary rigidity, and provides an elasticity, to allow the pinch welt 66 to be attached to the pinch flange. Because the U-shaped insert 52 and the outer layer 64 are made of compatible materials, the entire pinch welt 66 can be recycled as a single unit after its useful life.

Figure 9:
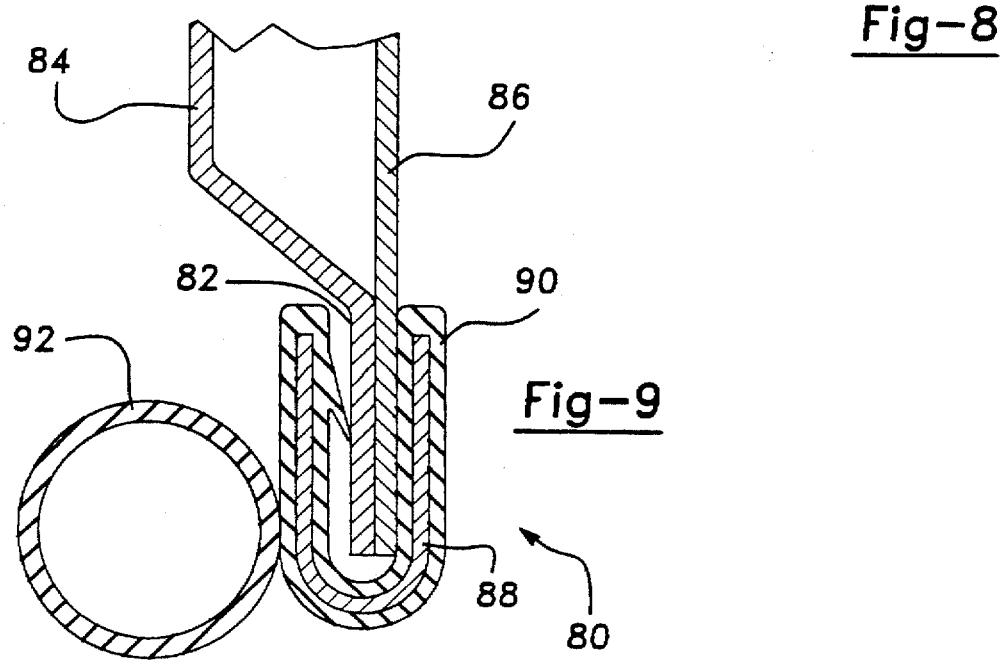
FIG. 9 is a cross-sectional view of a pinch welt and an associated sealing member positioned on a pinch flange connecting two vehicle panels.

FIG. 9 shows a cross-sectional view of a pinch welt 80 formed by the process of the invention secured to a pinch flange 82 formed where two panels 84 and 86 are joined. The panels 84 and 86 can be the inner and outer door panels of a vehicle, or other vehicle panels. An insert 88 within an outer decorative layer 90 of the pinch welt 80 provides an elasticity that grasps the pinch flange 82 in a resilient fashion so as to secure the pinch welt 80 to the flange 82. In this diagram, the pinch welt 80 includes a seal bulb 92 that acts as a door seal, and can be extruded onto the insert at the same time as the outer layer 90, as is well understood in the art. Alternately, the seal bulb 92 can be glued to the pinch welt 80 after the pinch welt 80 has been formed.

The foregoing discussion discloses and describes merely exemplary embodiments of the present invention. One skilled in the art will readily recognize from such discussion, and from the accompanying drawings and claims, that various changes, modification and variations can be made therein without departing from the spirit and scope of the invention as defined in the following claims.

What is claimed is:

1. A molding member for a vehicle comprising:
   an insert made of a first material, said insert having legs extending from a base portion in a manner that defines a U-shaped channel, said first material being a material that allows the legs to be flexible, said legs including a plurality of spaced-apart tines positioned on a common thin webbing made of the first material and extending from the base portion of the insert; and
   an outer layer made of a second material completely formed around the insert such that the molding member is a U-shaped member, said first material being a more resilient material wherein than the second material, wherein the first material causes the insert to be resilient to such a degree that legs of the molding member return to an original position when forcibly separated apart, wherein the first and second materials are compatible materials so as to allow the molding member to be recycled as a single unit.

2. The molding member according to claim 1 wherein a Young's Modulus of the insert is greater than a Young's Modulus of the outer layer so as to provide the resilience of the legs of the molding member.

3. The molding member according to claim 1 wherein the tines are formed on the thin webbing such that the tines are on an outside surface of the webbing.

4. The molding member according to claim 1 wherein the tines are formed on the thin webbing such that the tines are formed on an inside surface of the webbing.

5. The molding member according to claim 1 wherein the tines are formed such that opposing tines on the legs are directly opposite from each other.

6. The molding member according to claim 1 wherein the tines are positioned on the legs such that the tines are not directly opposing each other.

7. The molding member according to claim 1 further comprising a reinforcement strip extending along the base portion of the insert.

8. The molding member according to claim 7 wherein the reinforcement strip extends along the base portion within the channel.

9. The molding member according to claim 1 wherein the outer layer is made of an open cell foam material.

10. The molding member according to claim 1 configured to be inserted on a flange of a vehicle body panel.

11. The molding member according to claim 1 wherein the first material and the second material are selected from the group consisting of thermoplastic, thermosetting, and synthetic rubber materials.

12. The molding member according to claim 1 wherein each of the plurality of tines have a tapered width such that a portion of each tine adjacent to the base portion is wider than a portion of each tine opposite to the base portion.

13. A molding member to be secured to a flange of a vehicle body panel of a vehicle, said molding member comprising:
   an insert made of a first material, said insert having legs extending from a base portion in a manner that defines a U-shaped channel, said first material being a material that allows the legs to be flexible, said legs including a plurality of spaced-apart tines positioned on a common thin webbing made of the first material and extending from the base portion of the insert; and
   an outer layer made of a second material completely formed around the insert such that the molding member is a U-shaped member, said first material being a more resilient material than the second material, wherein the first material causes the insert to be resilient in such a manner that legs of the U-shaped molding member return to an original position when forcibly separated apart, and wherein the first and second materials are compatible materials so as to allow the molding member to be recyclable as a single unit.

14. The molding member according to claim 13 wherein the tines are formed on the thin webbing such that the tines are formed on an outside surface of the webbing.

15. The molding member according to claim 13 wherein the tines are formed on the thin webbing such that the tines are formed on an inside surface of the webbing.

16. The molding member according to claim 13 further comprising a reinforcement strip extending along the base portion of the insert.

17. The molding member according to claim 13 wherein the outer layer is made of an open cell foam material.

18. The molding member according to claim 13 wherein each of the plurality of tines have a tapered width such that a portion of each tine adjacent to the base portion is wider than a portion of each tine opposite to the base portion.

19. A molding member to be secured to a flange of a vehicle body panel of a vehicle, said molding member comprising:
   an insert made of a first material, said first material being selected from the group consisting of thermoplastic, thermoset and rubber materials, said insert having legs extending from a base portion in a manner that defines a U-shaped channel, said first material being a material that allows the legs to be flexible, said legs including a plurality of spaced-apart tines positioned on a common thin webbing made of the first material and extending from the base portion; and
   an outer layer made of a second material completely formed around the insert such the molding member is a U-shaped member, said second material being selected from the group consisting of thermoplastic, thermoset, and rubber materials, wherein a Young's modulus of the insert is greater than a Young's modulus of the outer layer so as to provide the resilience of the legs of the molding member, and wherein the first material causes the insert to be resilient to such a degree that the legs of the molding member return to an original position when forcibly separated apart.

20. The molding member according to claim 19 wherein each of the plurality of tines have a tapered width such that a portion of each tine adjacent to the base portion is wider than a portion of each tine opposite to the base portion.

* * * * *